(12) United States Patent
Mazzini et al.

(10) Patent No.: US 8,903,247 B2
(45) Date of Patent: Dec. 2, 2014

(54) BIDIRECTIONAL MULTI-MODE FIBER INTERFACE

(75) Inventors: Marco Mazzini, Sesto San Giovanni (IT); Cristiana Muzio, Ivrea (IT); Alessandro Sguazzotti, Caponago (IT); Federico Fontanella, Seregno (IT)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 12/609,574

(22) Filed: Oct. 30, 2009

(65) Prior Publication Data

US 2011/0103796 A1 May 5, 2011

(51) Int. Cl.
*H04B 10/24* (2006.01)
*H04B 10/00* (2013.01)
*H04B 10/25* (2013.01)
*H04B 10/2581* (2013.01)

(52) U.S. Cl.
CPC ........ *H04B 10/2503* (2013.01); *H04B 10/2581* (2013.01)
USPC ............ 398/136; 398/42; 398/135; 398/137; 398/138; 398/139

(58) Field of Classification Search
None
See application file for complete search history.

(56) References Cited

U.S. PATENT DOCUMENTS

| 5,278,687 | A | | 1/1994 | Jannson et al. |
| 5,963,349 | A | * | 10/1999 | Norte ............................. 398/42 |
| 7,401,985 | B2 | | 7/2008 | Aronson et al. |
| 7,548,675 | B2 | | 6/2009 | Tatum et al. |
| 2005/0226618 | A1 | * | 10/2005 | Lange et al. .................... 398/79 |
| 2006/0077778 | A1 | * | 4/2006 | Tatum et al. ............... 369/44.11 |
| 2007/0098405 | A1 | | 5/2007 | McEwan et al. |
| 2007/0237472 | A1 | * | 10/2007 | Aronson et al. ............. 385/101 |
| 2008/0159756 | A1 | * | 7/2008 | Cheng et al. .................. 398/210 |
| 2010/0284698 | A1 | * | 11/2010 | McColloch .................... 398/135 |

OTHER PUBLICATIONS

PCT International Search Report and Written Opinion, PCT/US2010/053683 (7 pages).

* cited by examiner

*Primary Examiner* — Darren E Wolf
(74) *Attorney, Agent, or Firm* — Edell, Shapiro & Finnan, LLC

(57) ABSTRACT

A bidirectional interface for multimode optical fiber includes a receive/transmit optical fiber port operable to connect to a multimode optical fiber, a wavelength separating module in communication with the receive/transmit optical fiber port, an optical receiver module in communication with the wavelength separating module and configured to receive optical signals at a first wavelength via the wavelength separating module and the receive/transmit optical fiber port, and an optical transmit module in communication with the wavelength separating module and configured to transmit at a second wavelength via the wavelength separating module and the receive/transmit optical fiber port.

19 Claims, 5 Drawing Sheets

BIDIRECTIONAL MULTI-MODE FIBER INTERFACE

TECHNICAL FIELD

The present disclosure relates to fiber optic interfacing techniques for multi-mode fiber optic cable.

BACKGROUND

The demand for communications via optical fiber continues to increase. Higher reliability and data rates along with lower power utilization for fiber compared to conventional copper wire infrastructure are just a few reasons for this increased use. This demand will increase further still as fiber is deployed for storage and network applications, as well as data center infrastructures.

However, increased usage and data rates come at a price, particularly in the form of increased cabling and increased cooling costs. In fact, it is estimated that cooling costs can contribute up to more than 50% of a data center's operating costs. Not surprisingly, the denser the fiber optic cabling is for a given infrastructure as a result of increased reliance on optical fiber connectivity, the less efficient cooling can be for equipment racks.

DESCRIPTION OF EXAMPLE EMBODIMENTS

Overview

Figure 1:
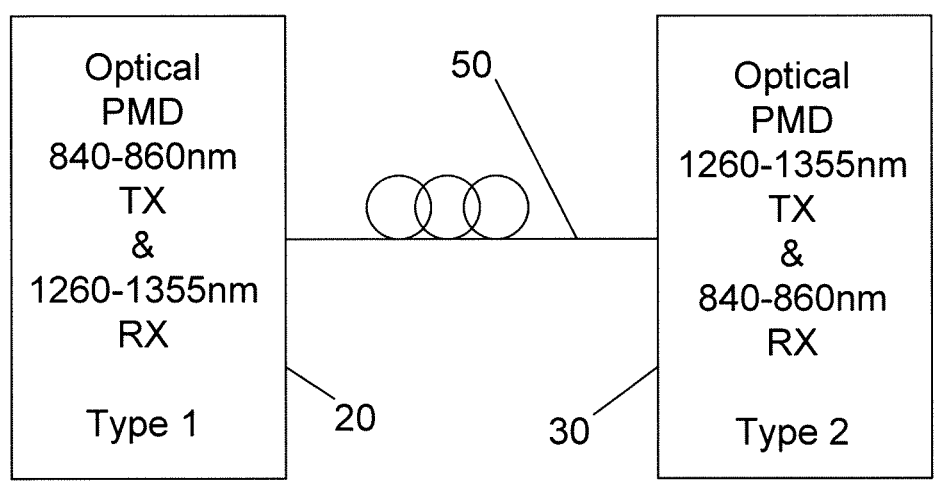
FIG. 1 shows bidirectional multimode fiber interfaces in accordance with an embodiment.

Described herein are an optical network interface, system and method that enable bidirectional optical communication over multimode optical fiber. In one embodiment, a device is provided with a receive/transmit optical fiber port operable to connect to a multimode optical fiber. A wavelength separating module is in communication with the receive/transmit optical fiber port. An optical receiver module is in communication with the wavelength separating module and is configured to receive optical signals at a first wavelength via the wavelength separating module and the receive/transmit optical fiber port. An optical transmit module is also in communication with the wavelength separating module and is configured to transmit at a second wavelength via the wavelength separating module and the receive/transmit optical fiber port, wherein, in operation, bidirectional optical communication is established over the multimode fiber.

In another embodiment, two interfaces are employed to establish bidirectional communication at, e.g., 850 nm and 1300 nm, over a single multimode fiber.

There are two general categories or types of fiber optic cable: single mode and multimode. The main difference between these types of cable is the core size and the corresponding characteristics that result from those core sizes. More specifically, single mode fiber has a smaller core size than multimode fiber. As a result, multimode fiber has higher "light-gathering" capacity than single mode optical fiber. In practical terms, the larger core size of multimode fiber simplifies connections and also allows the use of lower-cost electronics such as light-emitting diodes (LEDs) and vertical-cavity surface-emitting lasers (VCSELs), which operate at the 850 nm and 1300 nm wavelengths. In contrast, single-mode fibers used in telecommunications operate at 1310 or 1550 nm and require more expensive laser sources.

Further, because multimode fiber has a larger core size than single mode fiber, multimode fiber supports more than one propagation mode. As a result, multimode fiber is limited by modal dispersion, while single mode is not. Due to the modal dispersion in multimode fiber, multimode fiber has higher pulse spreading rates than single mode fiber, limiting multi-mode fiber's information transmission capacity.

Optical multi-mode (OM) fibers are described using a system of classification determined by the ISO 11801 standard, and is presently classified as OM1, OM2, and OM3. OM1 has a core/cladding relationship of 62.5/125 μm, and OM2 has a 50/125 μm core/cladding relationship. These fibers support applications ranging from Ethernet (10 Mbit/s) to Gigabit Ethernet (1 Gbit/s) and, because of their relatively large core size, are suitable for use with LED transmitters. Newer deployments often use laser-optimized 50/125 μm multi-mode fiber (OM3). Fibers that meet this latter standard provide sufficient bandwidth to support 10 Gigabit Ethernet up to 300 meters. Optical fiber manufacturers have greatly refined their manufacturing processes since the ISO 11801 standard was issued, and cables are presently being made that support 10 GbE up to 550 meters (tentatively designated "OM4"). Laser optimized multimode fiber (LOMMF) is designed for use with 850 nm VCSELs.

The migration to LOMMF/OM3 has occurred as users upgrade to higher speed networks. LEDs have a maximum modulation rate of 622 Mbit/s because they can not be turned on/off fast enough to support higher bandwidth applications. On the other hand, VCSELs are capable of modulation over 10 Gbit/s and are used in many high speed networks.

Consistent with the foregoing, several improvements have recently been introduced to ensure the longest 10G Ethernet (10GE) transmission over multimode fibers.

First, OM3, and now also OM4 (also having a 50/125 um core/cladding relationship), fibers are increasingly being used (as noted, these fibers have been optimized for propagation conditions at 850 nm).

As well, new interfaces that employ Electronic-Dispersion-Compensation (EDC) devices have been developed in order to allow long distances achievements over all the fiber types.

To run 10GE traffic for low-cost data center application, two main optical "reaches" are available: 10GBASE-SR (short wavelength reach) and 10GBASE-LRM (long wavelength reach, multimode).

10GBASE-SR is an 850 nm VCSEL-based interface that leverages the optimization of the fiber modal bandwidth (so called MBW or EMBW if one takes into account the Effective modal bandwidth that one particular laser technology can "see" due its particular spatial launch into the fiber).

10GBASE-LRM is a 1300 nm interface that leverages Electronic Dispersion Compensation (EDC) to compensate for transmission penalties due to light propagation into a spectral region in which the fiber modal bandwidth is not optimized. This permits LRM interfaces to enable longer distance communication over OM1 and OM2 fibers in comparison to 10GBASE-SR interfaces, while the budget over OM3 fiber is similar between LRM and SR (220 m and 300 m, respectively) interfaces.

In an embodiment, 10GBASE (10 gigabit Ethernet) bidirectional interfaces are provided and comprise a dual-transceiver system via which bi-directional propagation over a single multi-mode fiber can be achieved.

In particular, such a pair of transceivers (designated type 1 and type 2) allows bidirectional propagation over a single fiber of an 850 nm signal in one direction and a 1310 nm in the opposite direction, over the same multimode fiber.

FIG. 1 shows bidirectional multimode fiber interfaces 20 and 30 in accordance with an embodiment. These interfaces are optical physical medium dependent (PMD) devices and would typically be rack mounted devices in, e.g., a datacenter. On the left side of the figure is a type 1 interface 20 that supports a first wavelength within the 840-860 nm region for transmission. On the right side of the figure, a type 2 interface 30 receives the 840-860 nm transmission using a suitable receiver.

The type 2 interface 30 supports a second wavelength within the 1260-1355 nm region for transmission and that transmission is received by the type 1 interface 20 on the left of the figure. The interfaces 20, 30 are in communication with one another via multimode fiber 50, such as OM3 or OM4 fiber.

Figure 2:
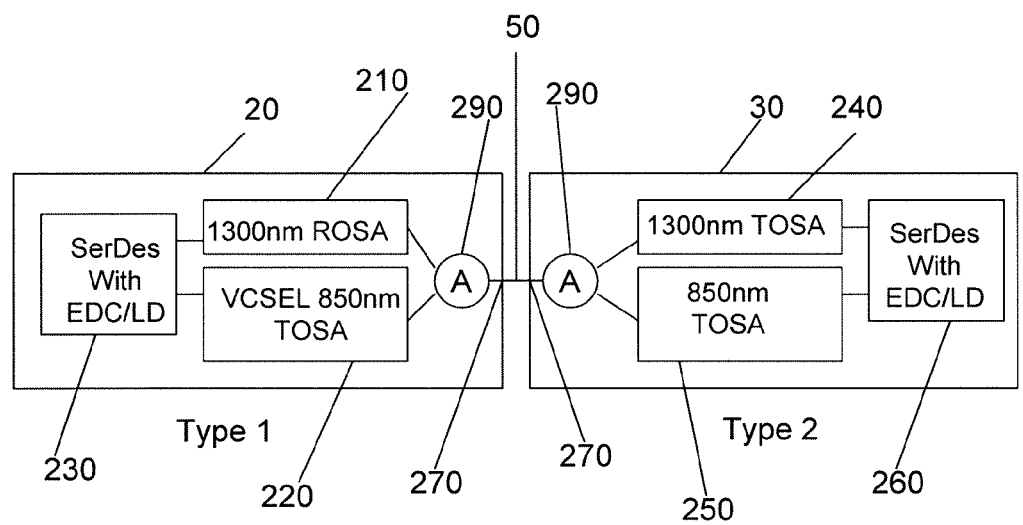
FIG. 2 is a more detailed block diagram of the interfaces shown in FIG. 1 in accordance with an embodiment.

FIG. 2 is a more detailed block diagram of the interfaces 20, 30 shown in FIG. 1 in accordance with an embodiment. As shown, the type 1 interface 20 includes a 1300 nm receiver optical sub-assembly (ROSA) 210 or receiver module, a VCSEL 850 nm transmitter optical sub-assembly (TOSA) 220 or transmit module, a Serializer/Deserializer (Ser/Des) with electronic dispersion compensation (EDC) and laser driver (LD) 230. The type 2 interface 30 comprises, e.g., a Fabry-Perot (FB) 1300 nm TOSA 240, an 850 nm ROSA 250 and Serializer/Deserializer with LD 260.

As further shown, each interface 20, 30 also include component "A" 290. Component A 290 is used to combine or separate the two wavelengths in order to achieve bi-directionality over the single multimode fiber 50 via a receive/transmit optical fiber port 270. 850 nm/1300 nm wavelength separation can be achieved, for example, with multi-mode isolators (or separators), or with multimode wavelength division multiplexer (WDM) filters or similar technologies. The added insertion losses (around 1.2 dB in the respective bandwidth) of such components can be easily managed within both the 850 nm and 1300 nm region's power budgets.

It is noted that the same type of bidirectional reach can be also implemented in a small form factor pluggable (SFP) format transceiver by, for example, having the EDC/LD disposed on a host board instead of inside the interface itself.

Type 1 and Type 2 interfaces 20, 30 are designed to work over OM3 and OM4 fibers because no mode conditioning patch cord can be applied on such bidirectional interfaces. While this may sound like a potential limitation, those skilled in the art will appreciate that the trend for new data centers is to install mainly these types of newer fiber types.

Using OM3 and OM4 fibers, 1300 nm transmission can be extended from the current 220 m range to 300 m, which is the same range that is achievable using the 850 nm wavelength.

Figure 3:
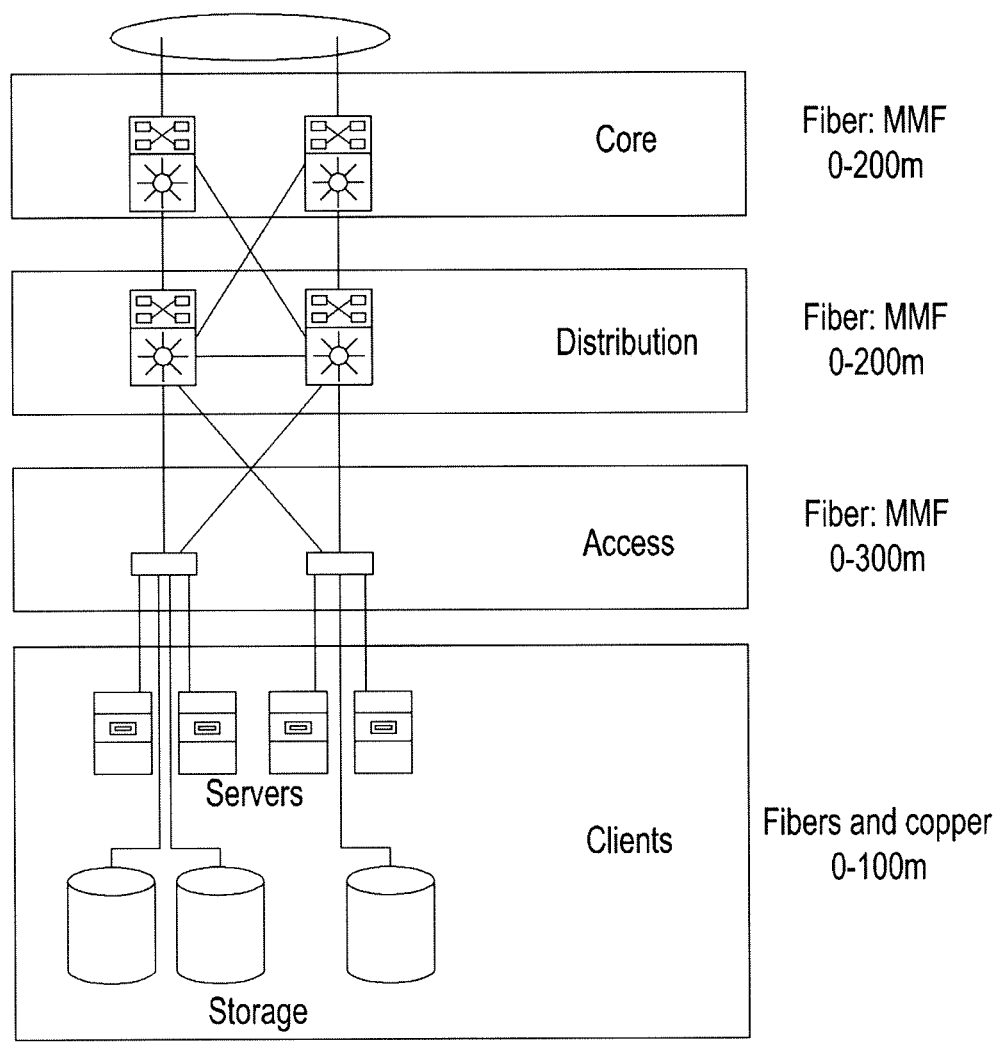
FIG. 3 shows the various layers at which bidirectional multimode fiber interfaces can be deployed in accordance with an embodiment.

The bidirectional interfaces 20, 30 described herein may be designated "10GBASE-BR" for 10 gigabit Ethernet bidirectional reach (BR). FIG. 3 shows the several layers at which the instant 10GBASE-BR bidirectional multimode fiber interfaces 20, 30 can be deployed in accordance with an embodiment. Specifically, as a result of the 300 meter distance achievable with both 850 nm and 1300 nm transmissions, the interfaces 20, 30 are suitable to be deployed at core, distribution, access and client (server/storage) layers of virtually any infrastructure. Notably, the bidirectional interfaces described herein can also be configured as very low-cost interfaces to address shorter target fiber distances (e.g., from 70 to 100 m over OM3 and OM4 fibers). In this case, there is no need to deploy EDC for type 1 interface 20.

Further, 10BASE-BR interfaces 20, 30 can be leveraged to enable full-bidirectional 40GE or even 100GE transmission link. To achieve a 40GE, for instance, four pairs of interfaces 20, 30 can be arranged in parallel. Conventionally, an 8-fiber ribbon would be needed to support (2×4) uni-directional transmissions. However, with the 10BASE-BR bidirectional interfaces described herein a 6-fiber ribbon could be used, thereby achieving considerable cost savings. Similarly, to achieve 100GE, ten pairs of 10BASE-BR interfaces 20, 30 can be deployed in parallel. In this case, a 12 fiber-ribbon (using only 10 of the fibers) would suffice, rather than a (2×10) 20-fiber ribbon for uni-directional transmissions. Those skilled in the art will accordingly appreciate that the bidirectional architecture described herein can save space (by relying on smaller size cable) and reduce costs not only for 10GE networks, but for parallel 40GE and 100GE systems.

Figure 4:
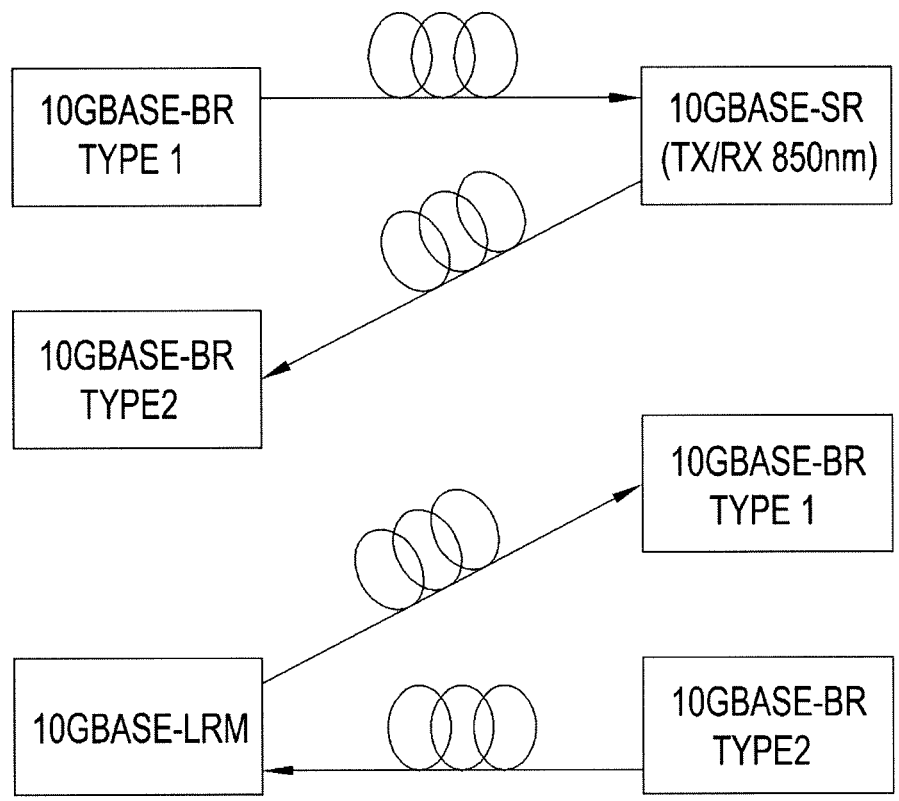
FIG. 4 shows possible physical connections between bidirectional multimode fiber interfaces and conventional interfaces in accordance with an embodiment.

FIG. 4 shows possible physical connections between bidirectional multimode fiber interfaces and 10GBASE-SR and 10GBASE-LRM interfaces in accordance with an embodiment. This figure shows how the 10BASE-BR interfaces are "backward compatible" with exiting interfaces.

As shown in FIG. 4, a 10BASE-SR interface transmits and receives (uni-directionally) at 850 nm. To transmit data to such a 10BASE-SR interface, a type 1 10BASE-BR interface 20 is selected as its transmitter transmits at 850 nm. To receive transmissions from a 10BASE-SR interface, a type 2 10BASE-BR interface 30 is selected since it receives optical signals in the 850 nm region.

As further shown in FIG. 4, a 10BASE-LRM interface transmits and receives (uni-directionally) at 1300 nm. Thus, to transmit data to such a 10BASE-LRM interface, a type 2 10BASE-BR interface 30 is selected as its transmitter transmits at 1300 nm. To receive transmissions from a 10BASE-LRM interface, a type 1 10BASE-BR interface 20 is selected since it receives optical data in the 1300 nm region.

From the foregoing, those skilled in the art will appreciate that there is provided bi-directional optics to enable bi-directional multimode fiber transmission into data centers and other network infrastructures.

Figure 5:
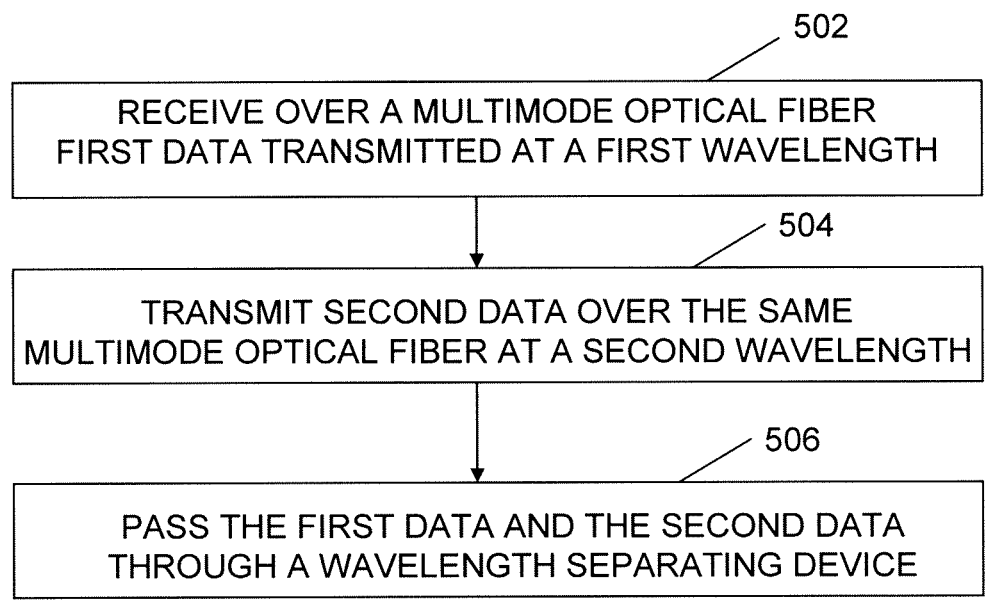
FIG. 5 shows a series of steps for achieving bidirectional communication over multimode fiber.

In accordance with a method of operation, and as depicted in FIG. 5, and also with reference to FIG. 2, one interface 20, at step 502, is operable to receive over a multimode optical fiber first data transmitted at a first wavelength. At the same time, and at step 504, the same interface is operable to transmit second data over the same multimode optical fiber at a second wavelength. Finally, at step 506, and as shown in FIG. 2, the first data and the second data are passed through a wavelength separating device so that each stream can be treated separately.

Several advantages are derived from such an architecture. For example, there are significant cost savings. Where implemented, the 10GBASE-BR interface, which has a manufacturing cost essentially equivalent to existing 10GBASE-SR and LRM interfaces, can save users up to 50% on fiber cabling. With fewer overall cables there are, consequently, lower maintenance costs due to less clutter (and thus possible increased cooling air flow in device racks) and reduced design costs.

For 40/100GBASE-BR deployments, other savings are realized since 12 or 24 fiber ribbons are more expensive than 6 or 12 ribbon fibers, where the latter can be used with a bidirectional interface deployment. Finally, because the 10GBASE-BR interfaces 20, 30 are configured to operate over the same 10GBASE-SR and LRM wavelength range, these interfaces can also interoperate (over OM3 and OM4 fibers) with existing 10GBASE-LRM and 10GBASE-SR devices.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A system, comprising:
   a first bidirectional interface connected via multimode optical fiber to a second bidirectional interface, wherein the multimode optical fiber is selected from OM3 and OM4, and wherein the multimode optical fiber has a length between 220 m and 300 m;
   the first bidirectional interface comprising:
      a first receive/transmit optical fiber port;
      a first wavelength separating module in communication with the receive/transmit optical fiber port;
      a first optical receiver module in communication with the first wavelength separating module and configured to receive optical signals at a first wavelength via the first wavelength separating module and the first receive/transmit optical fiber port, wherein the first wavelength is in a range from 840 nm to 860 nm; and
      a first optical transmit module in communication with the first wavelength separating module and configured to transmit at a second wavelength via the first wavelength separating module and the first receive/transmit optical fiber port,
   wherein the second wavelength is in a range from 1260 nm to 1355 nm; and
      first electronic dispersion compensation circuitry connected to the first optical receiver module,
   the second bidirectional interface comprising:
      a second receive/transmit optical fiber port;
      a second wavelength separating module in communication with the second receive/transmit optical fiber port;
      a second optical receiver module in communication with the second wavelength separating module and configured to receive optical signals at the second wavelength via the second wavelength separating module and the second receive/transmit optical fiber port; and
      a second optical transmit module in communication with the second wavelength separating module and configured to transmit at the first wavelength via the second wavelength separating module and the second receive/transmit optical fiber port, and
   wherein, in operation, bidirectional optical communication is established over the multimode optical fiber at at least 10 Gbit/s and facilitated by the electronic dispersion compensation circuitry; and
   wherein the first bidirectional interface and the second bidirectional interface are each configured within a small form factor pluggable (SFP) format transceiver.

2. The system of claim 1, wherein at least one of the first and the second wavelength separating modules comprises a multimode separator.

3. The system of claim 1, wherein at least one of the first and the second wavelength separating modules comprises a multimode wavelength division multiplexer.

4. The system of claim 1, wherein each of the first bidirectional interface and the second bidirectional interface further comprises a laser driver disposed on a host board separate from the SFP format transceiver.

5. A method comprising:
   receiving at a first small form factor pluggable (SFP) format transceiver first data transmitted at a first wavelength over a multimode optical fiber at at least 10 Gbit/s, wherein the multimode optical fiber is selected from OM3 and OM4, wherein the multimode optical fiber has a length between 220 m and 300 m, and wherein the first wavelength is in a range from 840 nm to 860 nm;
   transmitting from the first SFP format transceiver second data over the same multimode optical fiber at a second wavelength at at least 10 Gbit/s wherein the second wavelength is in a range from 1260 nm to 1355 nm;
   passing the first data and the second data through a wavelength separating device implemented within the first SFP format transceiver,
   receiving at a second SFP format transceiver the second data transmitted at the second wavelength over the multimode optical fiber at at least 10 Gbit/s;
   transmitting from the second SFP format transceiver first data over the same multimode optical fiber at the first wavelength at at least 10 Gbit/s; and
   passing the first data and the second data through a wavelength separating device implemented within the second SFP format transceiver,
   wherein the receiving and the transmitting at at least 10 GBit/s is facilitated by the electronic dispersion compensation circuitry in the first SFP format transceiver.

6. The system of claim 1 comprising four first bidirectional interfaces and four second bidirectional interfaces to enable a bidirectional 40 GE transmission link.

7. The system of claim 1, wherein the first bidirectional interface further comprises a serializer/deserializer.

8. The system of claim 1, wherein the second bidirectional interface further comprises a serializer/deserializer.

9. The system of claim 1, wherein the second optical transit module comprises a vertical-cavity surface-emitting later.

10. The system of claim 1, wherein the first optical transmit module comprises a Fabry-Perot laser.

11. The system of claim 1, wherein the first electronic dispersion compensation circuitry is configured to compensate for transmission penalties due to light propagation into a spectral region in which a fiber modal bandwidth is not optimized.

12. The system of claim 1, wherein the first bidirectional interface further comprises a laser driver disposed on a host board separate from the SFP format transceiver.

13. The system of claim 1, wherein the second bidirectional interface further comprises a laser driver disposed on a host board separate from the SFP format transceiver.

14. The system of claim 1, wherein the system is implemented in a rack-mounted device.

15. The method of claim 5, wherein transmitting from the first SFP format transceiver comprises transmitting from a Fabry-Perot laser.

16. The method of claim 5, wherein transmitting from the second SFP format transceiver comprises transmitting from a vertical-cavity surface-emitting laser.

17. The method of claim 5, further comprising passing the first data and the second data through a serializer/deserializer at the first SFP format transceiver.

18. The method of claim 5, further comprising passing the first data and the second data through a serializer/deserializer at the second SFP format transceiver.

19. The method of claim 5, wherein the receiving and the transmitting at at least 10 GBit/s is facilitated by electronic dispersion compensation compensating for transmission penalties due to light propagation into a spectral region in which a fiber modal bandwidth is not optimized.

\* \* \* \* \*